US00RE42513E

(19) United States
(12) Reissued Patent
Clothier

(10) Patent Number: US RE42,513 E
(45) Date of Reissued Patent: Jul. 5, 2011

(54) RFID—CONTROLLED SMART RANGE AND METHOD OF COOKING AND HEATING

(75) Inventor: Brian L. Clothier, Wichita, KS (US)

(73) Assignee: HR Technology, Inc., Wichita, KS (US)

(21) Appl. No.: 11/334,819

(22) Filed: Jan. 18, 2006

Related U.S. Patent Documents

Reissue of:
(64) Patent No.: 6,953,919
Issued: Oct. 11, 2005
Appl. No.: 10/355,989
Filed: Jan. 31, 2003

U.S. Applications:
(60) Provisional application No. 60/444,327, filed on Jan. 30, 2003.

(51) Int. Cl.
*H05B 6/12* (2006.01)
*H05B 6/06* (2006.01)

(52) U.S. Cl. ..... 219/620; 219/621; 219/627; 219/667; 219/494; 99/325

(58) Field of Classification Search ..... 99/451, 99/325; 340/572.1, 825.37; 219/620–627, 219/663–667, 702–720, 494, 497
See application file for complete search history.

(56) References Cited

U.S. PATENT DOCUMENTS

| | | | |
|---|---|---|---|
| 1,975,436 | A | 10/1934 | Sorrel et al. |
| 1,975,437 | A | 10/1934 | Sorrel |
| 1,975,438 | A | 10/1934 | Sorrel |
| 2,988,623 | A | 6/1961 | Ross et al. |
| 3,153,132 | A | 10/1964 | Greene |
| 3,612,803 | A | 10/1971 | Klaas |
| 3,734,077 | A | 5/1973 | Murdough et al. |
| 3,742,174 | A | 6/1973 | Harnden, Jr. |
| 3,742,178 | A | 6/1973 | Harnden, Jr. |

(Continued)

FOREIGN PATENT DOCUMENTS

| | | |
|---|---|---|
| CH | 294154 | 1/1954 |

(Continued)

OTHER PUBLICATIONS

Cooking & Laundry Technology; Automatic Cooktop; Reprinted from AM—Appliance Manufacturer, Feb. 2002.

(Continued)

*Primary Examiner* — Quang T Van
(74) *Attorney, Agent, or Firm* — Hovey Williams LLP

(57) ABSTRACT

A system and method for providing multiple cooking modes and an ability to automatically heat cooking vessels and other objects using RFID technology, and an ability to read and write heating instructions and to interactively assist in their execution. An induction heating range is provided with two antennas per hob, and includes a user interface display and input mechanism. The vessel includes an RFID tag and a temperature sensor. In a first cooking mode, a recipe is read by the range and the range assists a user in executing the recipe by automatically heating the vessel to specified temperatures and by prompting the user to add ingredients. The recipe is written to the RFID tag so that if the vessel is moved to another hob, into which the recipe has not been read, the new hob can read the recipe from the RFID tag and continue in its execution.

20 Claims, 6 Drawing Sheets

U.S. PATENT DOCUMENTS 3,742,179 A 6/1973 Harnden, Jr.
3,745,290 A 7/1973 Harnden, Jr. et al.
3,761,668 A 9/1973 Harnden, Jr. et al.
3,777,094 A 12/1973 Peters, Jr.
3,786,220 A 1/1974 Harnden, Jr.
3,806,688 A 4/1974 MacKenzie et al.
3,828,164 A 8/1974 Fischer et al.
3,843,857 A 10/1974 Cunningham
3,916,872 A 11/1975 Kreis et al.
3,978,307 A 8/1976 Amagami et al.
3,979,572 A 9/1976 Ito et al.
3,989,916 A 11/1976 Amagami et al.
4,013,859 A 3/1977 Peters, Jr.
4,016,392 A 4/1977 Kobayashi et al.
4,020,310 A 4/1977 Souder, Jr. et al.
4,032,740 A 6/1977 Mittelmann
4,035,606 A 7/1977 Browder
4,110,587 A 8/1978 Souder, Jr. et al.
4,115,676 A 9/1978 Higuchi et al.
4,235,282 A 11/1980 de Filippis et al.
4,246,884 A 1/1981 Vandas
4,256,945 A 3/1981 Carter et al.
4,266,108 A 5/1981 Anderson et al.
4,319,109 A 3/1982 Bowles
4,381,438 A 4/1983 Goessler et al.
4,454,403 A 6/1984 Teich et al.
4,456,807 A 6/1984 Ogino et al.
4,527,031 A 7/1985 Aparicio
4,533,807 A 8/1985 Minamida
4,542,271 A 9/1985 Tanonis et al.
4,544,818 A 10/1985 Minamida
4,555,608 A 11/1985 Mizukawa et al.
4,556,770 A 12/1985 Tazima et al.
4,560,849 A 12/1985 Migliori et al.
4,567,877 A 2/1986 Sepahpur
4,568,810 A * 2/1986 Carmean ..... 219/720
4,572,864 A 2/1986 Benson et al.
4,587,406 A 5/1986 Andre
4,614,852 A 9/1986 Matsushita et al.
4,617,442 A 10/1986 Okuda
4,625,098 A 11/1986 Joe
4,638,135 A 1/1987 Aoki
4,646,935 A 3/1987 Ulam
4,764,652 A 8/1988 Lee
4,774,395 A 9/1988 Yabuuchi et al.
4,776,386 A 10/1988 Meier
4,795,886 A 1/1989 Carter, Jr.
4,810,847 A 3/1989 Ito
4,816,633 A 3/1989 Mucha et al.
4,816,646 A 3/1989 Solomon et al.
4,820,891 A 4/1989 Tanaka et al.
4,864,088 A * 9/1989 Hiejima et al. ..... 219/707
4,914,267 A 4/1990 Derbyshire
4,916,290 A 4/1990 Hawkins
4,982,722 A 1/1991 Wyatt
4,983,798 A 1/1991 Eckler et al.
4,987,828 A 1/1991 Nuns et al.
4,996,405 A 2/1991 Poumey et al.
RE33,644 E 7/1991 Hall
5,052,369 A 10/1991 Johnson
5,078,050 A 1/1992 Smith
5,079,398 A 1/1992 Kuziemka
5,125,391 A 6/1992 Srivastava et al.
5,129,314 A 7/1992 Hu
5,134,265 A 7/1992 Dickens et al.
5,177,333 A 1/1993 Ogasawara
5,180,075 A 1/1993 Montalbano
5,194,708 A 3/1993 Carter, Jr.
5,202,150 A 4/1993 Benson et al.
5,227,597 A 7/1993 Dickens et al.
5,254,380 A 10/1993 Salyer
5,379,042 A 1/1995 Henoch
5,401,939 A 3/1995 Iguchi et al.
5,408,073 A 4/1995 Jeong
5,424,514 A 6/1995 Lee
5,424,519 A 6/1995 Salee
5,466,915 A 11/1995 Meier et al.
5,487,329 A 1/1996 Fissler
5,493,103 A 2/1996 Kuhn
5,499,017 A 3/1996 Beigel
5,518,560 A 5/1996 Li
5,530,702 A 6/1996 Palmer et al.
5,603,858 A 2/1997 Wyatt et al.
5,611,328 A 3/1997 McDermott
5,643,485 A 7/1997 Potter et al.
5,648,008 A 7/1997 Barritt et al.
5,682,143 A 10/1997 Brady
5,705,794 A 1/1998 Gillespie et al.
5,750,962 A 5/1998 Hyatt
5,874,902 A 2/1999 Heinrich et al.
5,880,435 A 3/1999 Bostic
5,885,636 A 3/1999 Carville
5,892,202 A 4/1999 Baldwin et al.
5,928,551 A 7/1999 Okabayashi
5,932,129 A 8/1999 Hyatt
5,951,900 A 9/1999 Smrke
5,954,984 A 9/1999 Ablah et al.
5,963,134 A 10/1999 Bowers et al.
5,963,144 A 10/1999 Kruest
5,968,398 A 10/1999 Schmitt et al.
5,999,700 A 12/1999 Geers
6,018,143 A 1/2000 Check
6,025,780 A 2/2000 Bowers et al.
6,046,442 A 4/2000 Kawamura et al.
6,060,696 A 5/2000 Bostic
6,072,383 A 6/2000 Gallagher, III et al.
6,097,014 A 8/2000 Kirsch
6,108,489 A 8/2000 Frohlich et al.
6,114,675 A 9/2000 Wada et al.
6,121,585 A 9/2000 Dam
6,201,474 B1 3/2001 Brady et al.
6,232,585 B1 5/2001 Clothier et al.
6,274,856 B1 8/2001 Clothier et al.
6,316,750 B1 11/2001 Levin
6,316,753 B2 11/2001 Clothier et al.
6,320,169 B1 * 11/2001 Clothier ..... 219/626
6,342,830 B1 1/2002 Want et al.
6,350,972 B1 2/2002 Wright et al.
6,353,208 B1 3/2002 Bostic et al.
6,359,268 B1 3/2002 Walter
6,384,387 B1 5/2002 Owens et al.
6,444,961 B2 9/2002 Clothier et al.
6,504,135 B2 1/2003 Clothier et al.
6,512,211 B1 1/2003 Lockhart et al.
6,664,520 B2 12/2003 Clothier
2001/0032546 A1 10/2001 Sharpe
2002/0008102 A1 1/2002 Boyd et al.
2003/0001009 A1 * 1/2003 Collins et al. ..... 235/385

FOREIGN PATENT DOCUMENTS

DE 2504827 8/1975
DE 3501304 7/1985
DE 4024432 2/1992
DE 4208249 9/1993
DE 4439095 11/1994
DE 4428353 2/1995
DE 4439095 5/1996
DE 19729662 7/1997
DE 19648397 11/1997
DE 19637561 2/1998
DE 19714701 10/1998
DE 19729661 1/1999
DE 19818831 10/1999
EP 0098497 6/1983
EP 0354151 2/1990
EP 0404209 12/1990
EP 0412875 2/1991
EP 0453634 10/1991
EP 0251333 12/1992
EP 0427879 2/1993
EP 0346860 1/1995
EP 0450744 10/1995
EP 0453634 1/1996
EP 0412875 4/1996
EP 0725556 8/1996
EP 0757509 2/1997
EP 0921708 6/1999

| | | |
|---|---|---|
| EP | 1239703 | 9/2002 |
| GB | 2199545 | 7/1988 |
| GB | 2308947 | 7/1997 |
| JP | 6463989 | 3/1989 |
| JP | 6489273 | 4/1989 |
| JP | 0298899 | 8/1990 |
| JP | 03-192684 | 8/1991 |
| JP | 6124776 | 5/1994 |
| JP | 11067439 | 9/1999 |
| JP | 2002-367764 | 12/2002 |
| WO | 9524817 | 9/1995 |
| WO | 9711578 | 3/1997 |
| WO | 9805184 | 2/1998 |
| WO | 9941950 | 8/1999 |
| WO | 9949766 | 10/1999 |
| WO | WO 0119141 | 3/2001 |

OTHER PUBLICATIONS

Flyer for Trade Show: 2002 International Appliance Tech. Conf. Held Mar. 25-27, 2002.
European Supplemental Search Report dated Jun. 9, 2007.
Japanese Patent Abstract; Publication No. 54-25542 B2; Publication Date: Feb. 26, 1979.
Japanese Patent Abstract Publication; Publication No. 10-149875 A; Publication Date: Jun. 2, 1998.
Japanese Publication; Publication No. 2001-122342; Publication Date: Aug. 5, 2001.
U.S. Provisional Patent Application entitled Heat Retentive Food Servingware With Temperature Self-Regulating Phase Change Core; U.S. Appl. No. 60/044,074; Inventor: Ablah Amil et al.; filed Jun. 15, 1996.
U.S. Provisional Patent Application entitled Temperature Self-Regulating, Inductively Heatable Vessels for Cooking, Warming, Serving, and Storing Food and Method; U.S. Appl. No. 60/035,815; Inventor: Ablah Amil et al; filed Jan. 8, 1997.
U.S. Patent Application entitled Heat Retentive Food Servingware With Temperature Self-Regulating Phase Change Core; U.S. Appl. No. 08/902,803; Inventor: Ablah Amil et al; filed Jul. 30, 1997.
U.S. Patent Application entitled Temperature Self-Regulating Food Delivery System; U.S. Appl. No. 09/314,824; Inventor: Ablah Amil et al; filed May 19, 1999.
U.S. Patent Application entitled Heat Retentive Food Servingware With Temperature Self-Regulating Phase Change Core; U.S. Appl. No. 08/688,987; Inventor: Brian Clothier; filed Jul. 31, 1999.
U.S. Patent Application Publication; Publication No. US 2001/0032546 A1; Publication Date: Oct. 25, 2001.
U.S. Patent Application entitled Temperature Self-Regulating Food Delivery System; U.S. Appl. No. 10/046,885; Inventor: Ablah Amil et al; filed Jan. 15, 2002.
U.S. Patent Application Publication; Publication No. US 2002/0008102 A1; Publication Date: Jan. 24, 2002.
Author Unknown. Kitchen Kapers Kitchenware Superstore. www.kitchenkapers.com/vesmirroylav.html.
Author Unknown. Scholtes—the Revolution Induction. www.scholtes.fr/induction/inductions/3_1.html.
Author Unknown. DIAS GmbH—Uncoiled Infrarred Detectors. www.dias-infrared.de/eng/products/sensors/sen_frm.php.
Author Unknown. Smart Pan RF Smart Cooktop System. Digital Cookware, Inc. www.digitalcookwareinc.com/NU810RF.htm.
Carter Hoffmann Corporation; Patient Meal Make-up and Delivery System Offers You Better Choices.
CookTek, Induction Cooking System; Smarktpak Pizza Thermal Delivery System PTDS-100, PTDS-200.
Metcal, The SmartHeat Company; Metcal SCC Soldering Cartridges.
Metcal, The SmartHeat Company; Metcal Tips and Accessories.
Metcal, The SmartHeat Company; Metcal/STSS Systems.
Seco Products Corporation; Healthcare Mini Catalog.
Seco Products Corproration; System 9-9 Unitized Base.
Seco Products Corporation; System 9-molded Cover for 9" Unitized Base System 7-molded Cover for 7¾" Unitized Base.
Seco Products Corporation; Unitized Base Dispensers.
Seco Products Corporation; System 9-Combination Base/China Dispense Base/Tray Dispenser.
S. Zinn and S.L. Semiatin, Elements of Induction Heating Design, Control, and Applications, pp. 157-161 (Battelle Press 1988).
Therma-Systems Corporation; Solutions Made Easy.
Tzeng, Jim J-W., George Getz, Brian S. Fedor, and Dan W. Krassowski. "Anisoptropic Graphite Heat Spreaders for Electronics Thermal Management". Graftech, Inc.

* cited by examiner

Mode 2

Mode 3

RFID—CONTROLLED SMART RANGE AND METHOD OF COOKING AND HEATING

Matter enclosed in heavy brackets [ ] appears in the original patent but forms no part of this reissue specification; matter printed in italics indicates the additions made by reissue.

RELATED APPLICATIONS

The present application claims priority benefit of and hereby incorporates by reference a provisional application titled "RFID-CONTROLLED SMART INDUCTION RANGE", Ser. No. 60/444,327, filed Jan. 30, 2003. *Reference is also made to divisional reissue application Ser. No. 11/774,696, filed Jul. 9, 2007.*

BACKGROUND OF THE INVENTION

1. Field of the Invention

The present invention relates broadly to cooking devices and apparatuses, particularly magnetic induction ranges. More particularly, the present invention relates to a magnetic induction range providing multiple cooking modes and an ability to automatically heat cooking vessels and other objects using RFID technology and temperature sensing, and an ability to read and write recipe or heating instructions using the RFID technology and to interactively assist in their execution.

2. Description of the Prior Art

It is often desirable to automatically monitor and control the temperature of food in a cooking or heating vessel using non-contact temperature-sensing means. Early attempts to do so include, for example, U.S. Pat. No. 5,951,900 to Smrke, U.S. Pat. No. 4,587,406 to Andre, and U.S. Pat. No. 3,742,178 to Harnden, Jr. These patents disclose non-contact temperature regulation devices and methods employing magnetic induction heating, including using radio frequency transmissions to communicate temperature information between the object to be heated and the induction heating appliance, in an attempt to control the induction heating process. More specifically, in Smrke, Andre, and Harnden a temperature sensor is attached to the object to be heated to provide feedback information which is transmitted in a non-contact manner to the induction appliance. In each case, aside from manual inputs by a user, changes to the induction appliance's power output are automatic and based solely upon information gathered and transmitted by the temperature sensor.

No known employment of the aforementioned prior art technology has resulted. However, other attempts to monitor and control the temperature of a vessel during cooking or holding using non-contact methods employing magnetic induction heaters and other electric hobs have been employed in the marketplace. Bosch, a major appliance manufacturer, has, for example, recently introduced ranges and cooking vessels that, together, provide a system using temperature feedback, based on temperature information gathered from the external surface of the vessel, to allow for automatically varying power output to the vessel and thereby control its temperature. As described in a paper titled "Infrared Sensor to Control Temperature of Pots on Consumer Hobs", authored by Uwe Has of Bosch-Siemens Hausgerate GmbH, Bosch's system employs an infrared sensor that is an integral part of the cooking hob. The infrared sensor is mounted on a cylindrical casing that is designed to direct the infrared sensing beam onto a specific portion of the cooking vessel at a height of approximately thirty millimeters above the bottom of the vessel. The temperature information gathered from the infrared sensor beam is used to alter the power output of the hob. Unfortunately, Bosch's infrared system suffers from a number of limitations, including, for example, an undesirably extreme sensitivity to changes in the emissivity of the region of the vessel on which the infrared sensor beam is directed. If the vessel's surface becomes soiled or coated with oil or grease, the emissivity changes and, as a result, the perceived or sensed temperature is not the actual temperature.

A cooking system comprising an induction range, marketed by Scholtes, and an accompanying infrared/radio frequency sensing device called the "Cookeye", marketed by Tefal, moves beyond the functionality of the Bosch range system. The Cookeye sensing unit rests upon the handle of the cooking vessel and directs an infrared sensor beam downward onto the food within the vessel to sense the temperature of the food. The Cookeye unit converts the temperature information into a radio frequency signal that is transmitted to a radio frequency receiving unit within the induction range. This radio frequency temperature information is used to alter the power output of the hob to control the temperature of the vessel. Furthermore, the system provides six preprogrammed temperatures, with each temperature corresponding to a class of foods, that the user can select by pressing a corresponding button on a control panel. Once one of the preprogrammed temperatures has been selected, the hob heats the vessel to that temperature and maintains the vessel at that temperature indefinitely. Unfortunately, the Scholtes/Tefal system also suffers from a number of limitations, including, for example, an excessive sensitivity to the emissivity of the food surfaces within the pan. Furthermore, though the six preprogrammed temperatures are an improvement over the Bosch product, they are still too limiting. Many more selectable temperatures are needed to most effectively or desirably cook or hold different types food.

It is also often desirable that a cooking apparatus provide features that allow for or facilitate substantially automatic preparation of culinary dishes. Attempts to design such a cooking apparatus include, for example, U.S. Pat. No. 4,649,810 to Wong. Wong discloses the broad concept of a microcomputer-controlled, integrated cooking apparatus for automatically preparing culinary dishes. In use, the constituent ingredients of a particular dish are first loaded into a compartmentalized carousel which is mounted on the cooking apparatus. The apparatus includes a memory for storing one or more recipe programs, each of which may specify a schedule for dispensing the ingredients from the carousel to a cooking vessel, for heating the vessel (either covered or uncovered), and for stirring the contents of the vessel. These operations are performed substantially automatically under the control of the microcomputer. Unfortunately, Wong suffers from a number of limitations, including, for example an undesirable reliance on a contact temperature sensor that is maintained in contact with the bottom of the cooking vessel by a thermal contact spring. Those with ordinary skill in the art will appreciate that such temperature measurements are notoriously unreliable because the contact is often not perfect when the vessel is placed upon the probe.

U.S. Pat. Nos. 6,232,585 and 6,320,169 to Clothier describe an RFID-equipped induction system that integrates an RFID reader/writer into the control system of the induction cooktop so as to utilize stored process information in an RFID tag attached to a vessel to be heated and to periodically exchange feedback information between the RFID tag and the RFID reader/writer. This system allows many different objects to be uniquely and automatically heated to a pre-selected regulation temperature because the required data is stored on the RFID tag. Unfortunately, Clothier suffers from a number off limitations, including, for example, that it does not employ real-time temperature information from a sensor attached to the vessel. Furthermore, the system does not allow the user to manually select a desired regulation temperature via a control knob on the range's control panel and have the hob substantially automatically achieve that desired temperature and maintain it indefinitely regardless of temperature changes in the food load. Thus, with Clothier, the user could not, for example, fry frozen food in a fry pan without continually having to manually adjust the power output of the hob during the cooking process.

Due to the above-identified and other problems and limitations in the prior art, an improved mechanism is needed for cooking and heating.

SUMMARY OF THE INVENTION

The present invention overcomes the above-identified problems and limitations in the prior art with a system and method providing multiple cooking modes and an ability to automatically heat cooking vessels and other objects using RFID technology and temperature sensing, and an ability to read and write recipe or heating instructions using the RFID technology and to interactively assist in their execution. In a preferred embodiment, the system broadly comprises an induction cooking appliance; an RFID tag; and a temperature sensor, wherein the RFID tag and the temperature sensor are associated with the cooking vessel. The induction cooking appliance, or "range", is adapted to heat the vessel using a well-known induction mechanism whereby an electric heating current is induced in the vessel. The range broadly includes a plurality of bobs, each including a microprocessor, an RFID reader/writer, and one or more RFID antennas; and a user interface including a display and an input mechanism. Although the preferred embodiment range employs magnetic induction, this invention may also utilize ranges employing electric resistance, electric radiant, halogen, gas, or other known energy transfer means. Accordingly, throughout this description a "range" may include cooking systems that employ any of these varieties of energy transfer means.

The RFID reader/writer facilitates communication and information exchange between the microprocessor and the RFID tag. More specifically, the RFID reader/writer is operable to read information stored in the RFID tag relating to process and feedback information, such as, for example, the vessel's identity, capabilities, and heating history.

The one or more RFID antennas facilitate the aforementioned communications and information exchange. Preferably, two RFID antennas, a center RFID antenna and a peripheral RFID antenna, are employed at each hob. The peripheral RFID antenna provides a read range that covers an entire quadrant of the hob's periphery such that the handle of the vessel, with the RFID tag located therein, can be located anywhere within a relatively large radial angle and still be in communication with the RFID reader/writer. Using two RFID antennas may require that they be multiplexed to the RFID reader/writer. Alternatively, it is also possible to power both RFID antennas at all times without sacrificing significant read/write range by configuring the RFID antennas in parallel.

The user interface allows for communication and information exchange between the range and the user. The display may be any conventional liquid crystal display or other suitable display device. Similarly, the input mechanism may be an easily cleaned membranous keypad or other suitable input device, such as, for example, one or more switches or buttons.

The RFID tag is, as mentioned, associated with the vessel, and is operable to communicate and exchange data with the hob's microprocessor via the RFID reader/writer. More specifically, the RFID tag stores the process and feedback information, including information concerning the vessel's identity, capabilities, and heating history, and can both transmit and receive that and other information to and from the RFID reader/writer. The RFID tag must also have sufficient memory to store the recipe or heating information, as discussed below.

The temperature sensor is connected to the RFID tag and is operable to gather information regarding the temperature of the vessel. The temperature sensor must touch an outside surface of the vessel. Furthermore, the point of attachment is preferably located no more than one inch above the induction-heated surface of the vessel. Wires connecting the temperature sensor to the RFID tag may be hidden, such as, for example, in the vessel's handle or in a metal channel.

In exemplary use and operation, the system functions as follows. The system provides at least three different modes of operation: Mode 1; Mode 2; and Mode 3. When the range is first powered-up, the hobs default to Mode 1. Mode 1 requires temperature feedback, thus Mode 1 can only be used with vessels having both an RFID tag and a temperature sensor. The hob's microprocessor awaits information from the RFID reader/writer indicating that a vessel having these components and capabilities has been placed on the hob. This information includes a "class-of-object" code that identifies, among other things, the vessel's type and the presence of the temperature sensor. Until this information is received, no current is allowed to flow in the work coil, and thus no unintended heating can occur. Once a suitable vessel has been detected, process and feedback information, described below in greater detail, is downloaded from the RFID tag and processed by the microprocessor.

The user may, as desired, download a recipe or other cooking or heating instructions to the hob. A recipe card, food package, or other item provided with its own RFID tag on which the recipe is stored is waved over one of the hob's RFID antennas so that the RFID reader/writer can read the attached RFID tag and download the recipe. If a recipe has been downloaded to the hob, and a vessel appropriate for Mode 1 has been placed on the hob, the RFID reader/writer will upload or write the recipe information to the vessel's RFID tag. If the vessel is thereafter moved to a different hob, the different hob can read the recipe and the process and feedback information from the vessel's RFID tag and continue with the recipe from the step last completed or, as appropriate, an earlier step.

If a recipe has not been scanned into the hob but the hob detects an appropriate vessel, the hob will check to see if a recipe has been recently written (by another hob) to the vessel's RFID tag. To accomplish this, the hob's microprocessor reads the vessel's process and feedback information to determine an elapsed time since a recipe was last written to the vessel's RFID tag. If the elapsed time indicates that a recipe was recently in progress, then the microprocessor will proceed to complete the recipe after determining an appropriate point or step within the recipe at which to start. If, however, the elapsed time indicates that a recipe was not recently in progress or has been completed, then the microprocessor may ignore any recipe found in the RFID tag and prompt the user to for new instructions or to download a new recipe to the hob.

Following the write operation, the entire recipe is stored in the vessel's RFID tag. The recipe may include such information as ingredient details and amounts, a sequence for adding the ingredients, stirring instructions, desired vessel type, vessel regulation temperature for each recipe step, maximum power level to be applied to the vessel during each recipe step, duration of each recipe step, delay times between each recipe step, holding temperature following recipe completion and maximum holding time, and a clock time to begin execution of the recipe so that cooking can begin automatically at the indicated time.

Once the vessel's RFID tag has been recently programmed with recipe information, the hob it is on or any other hob it is moved to will sense this and will immediately read the temperature of the vessel via its temperature sensor. The hob will then proceed with the recipe steps to actively assist the user in preparing the food in accordance with the recipe. Such assistance may include, for example, prompting the user, via the display of the user interface, to add specified amounts of ingredients at appropriate times. The user may be required to indicate, using the input mechanism of the user interface, that the addition of ingredients or other required action has been completed. The assistance also preferably includes automatically heating the vessel to a temperature or series of temperatures specified by the recipe and maintaining that temperature for a specified period of time.

During the Mode 1 recipe-following process, a time stamp reflecting execution of each recipe step as well as the time elapsed since performing the step is periodically written to the vessel's RFID tag. If the user removes the vessel from the hob prior to completion and then replaces the vessel on another hob, the new hob's microprocessor will continue the recipe process at an appropriate point within the recipe. This "appropriate point" may be the next recipe step following the step last completed, or may be a previous step preceding the last step completed. Furthermore, if the elapsed timed away from a hob is substantial, adjustments may need to be made. For example, if the most recently completed step requires that the vessel be maintained for a certain duration at a recipe-stipulated temperature, then the duration may need to be increased if it is determined that the vessel may have cooled excessively while away from a hob. Preferably, the automatic assistance provided by the range can be overridden as desired by the user in order to, for example, increase or decrease the duration of a step.

Mode 2 is a manual RFID-enhanced mode and also requires temperature feedback. Thus, Mode 2, like Mode 1, can only be used with vessels having both an RFID tag and a temperature sensor. The process information that accompanies the appropriate vessel's class-of-object code includes a limiting temperature and a temperature offset value. The limiting temperature is the temperature above which the hob's microprocessor will not allow the pan to be heated, thereby avoiding fires or protecting non-stick surfaces or other materials from exceeding safe temperatures. The temperature offset value is preferably a percentage of the selected regulation temperature which becomes a desired temperature during transient heat-up conditions.

The main function of Mode 2 is to allow the user to place an appropriate vessel on the hob, to manually select a desired regulation temperature via the user interface, and to be assured that the hob will thereafter heat the vessel to achieve and maintain the selected temperature so long as the selected temperature does not exceed the limiting temperature. To accomplish achieving and maintaining the selected temperature without significant overshoot, Mode 2 periodically calculates a temperature differential between the actual and selected temperatures and bases its power output on the temperature differential. For example, if the temperature differential is relatively large, then the hob may output full power; but if the temperature differential is relatively small, then the hob may output less than full power in order to avoid overshooting the selected temperature.

Mode 3 is a manual power control mode that does not employ any RFID information, such that any induction-suitable vessel or object can be heated in Mode 3. Many prior art ranges provide a mode of operation that is similar to Mode 3. However, a feature of Mode 3 in the present invention which is not disclosed in the prior art is that if any vessel having an RFID tag and an appropriate class-of-object code is placed on the hob, the hob will automatically leave Mode 3 and enter Mode 1 and execute an appropriate procedure. This feature attempts to prevent the user from inadvertently employing Mode 3 with a vessel that the user mistakenly believes will achieve automatic temperature regulation in that mode.

Thus, it will be appreciated that the cooking and heating system and method of the present invention provides a number of substantial advantages over the prior art, including, for example, providing for precisely and substantially automatically controlling a temperature of a vessel that has an attached RFID tag. Furthermore, the present invention advantageously allows a user to select the desired temperature of the vessel from a wider range of temperatures than is possible in the prior art. The present invention also advantageously provides for automatically limiting heating of the vessel to a pre-established maximum safe temperature. The present invention also provides for automatically heating the vessel to a series of pre-selected temperatures for pre-selected durations. Additionally, the present invention advantageously ensures that any of several hobs are able to continue the series of pre-selected temperatures and pre-selected durations even if the vessel is moved between hobs during execution of the series. The present invention also advantageously provides for compensating for any elapsed time in which the vessel was removed from the range during the series, including, when necessary, restarting the process or reverting to an appropriate point in the recipe. Additionally, the present invention advantageously provides for exceptionally fast thermal recovery of the vessel to the selected temperature regardless of any change in cooling load, such as the addition of frozen food to hot oil within the vessel.

Additionally, the present invention advantageously provides for reading and storing recipe or other cooking or heating instruction from food packages, recipe cards, or other items. The recipe may be stored in an RFID tag on the item and may define the aforementioned series of pre-selected temperatures for pre-selected durations. The present invention also advantageously provides for writing the recipe or other instructions to the RFID tag of the vessel, thereby allowing execution of the recipe to continue even after the vessel has been moved to another hob into which the recipe has not been previously or directly entered. The present invention also advantageously provides for interactive assistance, including prompting, in executing the recipe or other instructions.

These and other important aspects of the present invention are more fully described in the section entitled DETAILED DESCRIPTION OF A PREFERRED EMBODIMENT, below.

DESCRIPTION OF THE DRAWINGS FIGURES

A preferred embodiment of the present invention is described in detail below with reference to the attached drawing figures, wherein.

DETAILED DESCRIPTION OF A PREFERRED EMBODIMENT

Figure 1:
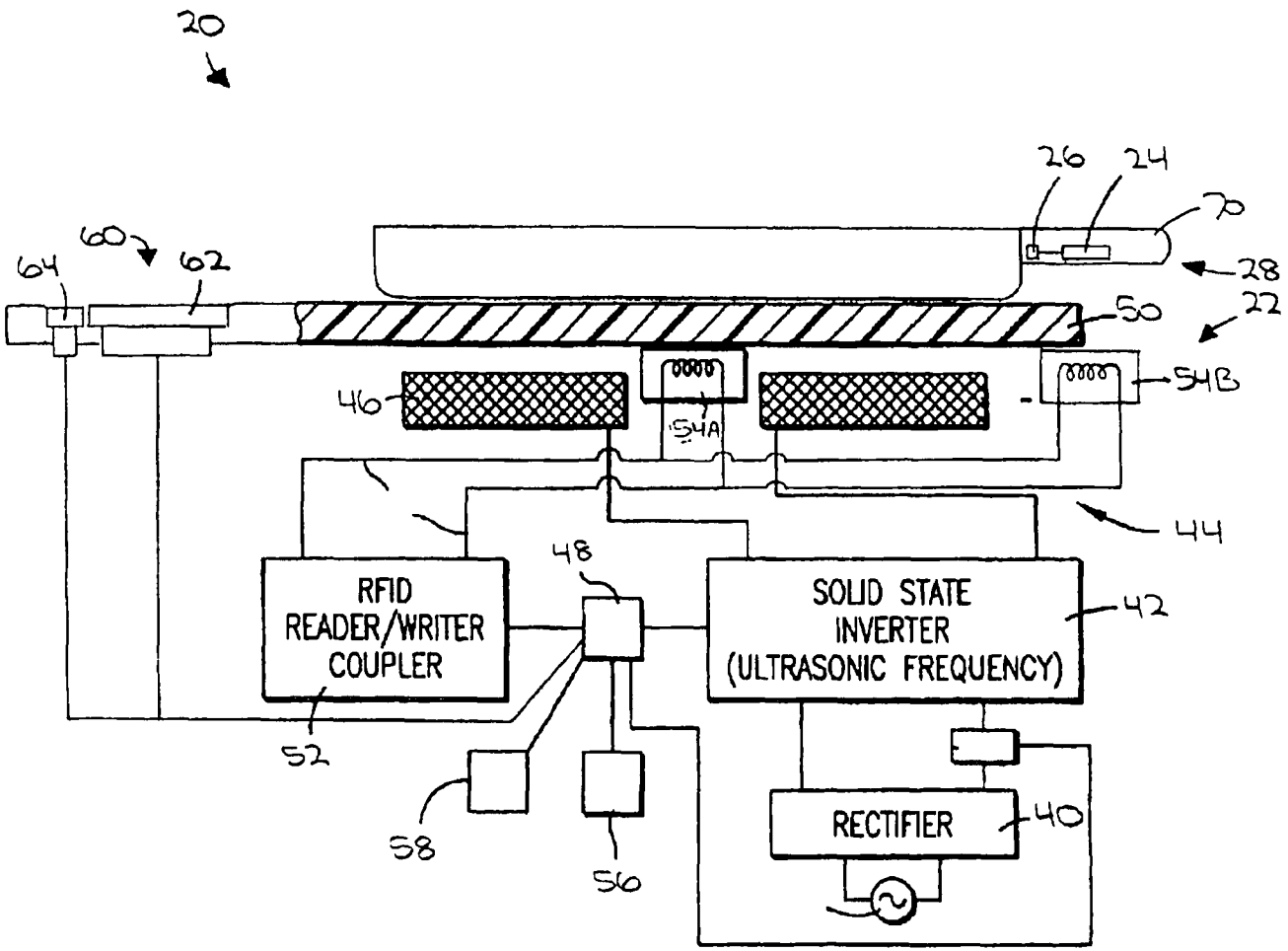
FIG. 1 is a schematic showing major components of a preferred embodiment of the cooking and heating system of the present invention.

Referring to the figures, a system 20 and method for cooking and heating is disclosed in accordance with a preferred embodiment of the present invention. Broadly, the system 20 and method provides multiple cooking modes and an ability to automatically heat cooking vessels and other objects using RFID technology and temperature sensing, and an ability to read and write recipe or heating instructions using the RFID technology and to interactively assist in their execution.

Those with ordinary skill in the arts pertaining to RFID technology will appreciate that it is an automatic identification technology similar in application to well-known bar code technology but using radio-frequency signals rather than optical signals. RFID systems can be either read-only or read/write. A read-only RFID system comprises both an RFID reader, such as, for example, the model OMR-705+ RFID reader by Motorola, and an RFID tag, such as, for example, the model IT-254E RFID tag by Motorola. The RFID reader performs several functions, one of which is to produce a low-level radio-frequency magnetic field, typically either at 125 kHz or at 13.56 MHz. This RF magnetic field emanates from the RFID reader via a transmitting antenna, typically in the form of a coil. The RFID reader may be sold as an RFID coupler, which includes a radio processing unit and a digital processing unit, and a separate, detachable antenna. The RFID tag also includes an antenna, also typically in the form of a coil, and an integrated circuit (IC). When the RFID tag encounters the magnetic field energy of the RFID reader, it transmits programmed memory information stored in the IC to the RFID reader. The RFID reader then validates the signal, decodes the information, and transmits the information to a desired output device, such as, for example, a microprocessor, in a desired format. The programmed memory information typically includes a digital code that uniquely identifies an object to which the RFID tag is attached, incorporated into, or otherwise associated. The RFID tag may be several inches away from the RFID reader's antenna and still communicate with the RFID reader.

A read/write RFID system comprises both an RFID reader/writer, such as, for example, the model GemWave Medio™ SO13 coupler by Gemplus or the model A-SA detachable antenna by Medio, and the RFID tag, such as, for example, the model 40-SL read/write tag by Ario, and is able both to read and write information from and to the RFID tag. The RFID tag may, after receiving information from the RFID reader/writer, store and later re-emit information back to that or another RFID reader/writer. This re-writing and re-transmitting can be performed either continuously or periodically. Actual transmission times are short, typically measured in milliseconds, and transmission rates can be as high as 105 kb/s. Memory in the RFID tags is typically erasable-programmable read-only memory (EEPROM), and significant memory storage capacity, typically 2 kb or more, is often available. Additionally, the RFID reader/writer may be programmed to communicate with other devices, such as other microprocessor-based devices, so as to perform complex tasks. RFID technology is described in substantial detail in U.S. Pat. No. 6,320,169, which is hereby incorporated by reference into the present application.

Referring to FIG. 1, the preferred embodiment of the system 20 of the present invention broadly comprises an induction cooking appliance 22, an RFID tag 24, and a temperature sensor 26, wherein the RFID tag 24 and the temperature sensor 26 are attached to, incorporated into, or otherwise associated with a cooking or heating vessel 28 or other similar object, such as, for example, servingware. The induction cooking appliance 22, also called a "cooktop" and hereinafter referred to as a "range", is adapted to heat the vessel 28 using a well-known induction mechanism whereby an electric heating current is induced in the vessel 28. The range 22 broadly includes a rectifier 40; a solid state inverter 42; a plurality of hobs 44, with each hob 44 including an induction work coil 46, a microprocessor 48, a vessel support mechanism 50, an RFID reader/writer 52, one or more RFID antennas 54A,54B, a real-time clock 56, and additional memory 58; a microprocessor-based control circuit (not shown); and a user interface 60, including a display 62 and an input mechanism 64.

The range 22 accomplishes induction heating in a substantially conventional manner. Briefly, the rectifier 40 first converts alternating current into direct current. The solid state inverter 42 then coverts the direct current into ultrasonic current, having a frequency of preferably approximately between 20 kHz and 100 kHz. This ultrasonic frequency current is passed through the work coil 46 to produce a changing magnetic field. The control circuit controls the inverter 42 and may also control various other internal and user-interface functions of the range 22, and includes appropriate sensors for providing relevant input. The vessel support mechanism 50 is positioned adjacent the work coil 46 so that the vessel 28, resting on the vessel support mechanism 50, is exposed to the changing magnetic field.

The RFID reader/writer 52 facilitates communication and information exchange between the microprocessor 48 and the RFID tag 24. More specifically, in the present invention the RFID reader/writer 52 is operable to read information stored in the RFID tag 24 relating to, for example, the vessel's identity, capabilities, and heating history. The RFID reader/writer 52 is connected to the microprocessor 48 using an RS-232 connection. The preferred RFID reader/writer 52 allows for RS-232, RS485, and TTL communication protocols and can transmit data at up to 26 kb/s. A suitable RFID reader/writer for use in the present invention is available, for example, from Gemplus as the model GemWave™ Medio SO13. It should be noted that, because the RFID reader/writer 52 is microprocessor-based, it is within the contemplated scope of the present invention that a single microprocessor could be programmed to serve both the RFID reader/writer 52 and the range's control circuit.

The one or more RFID antennas 54A,54B connect to the RFID reader/writer 52 via a coaxial cable and function to further facilitate the aforementioned communication and information exchange. Preferably the RFID antennas 54A, 54B are small in size, lack a ground plane, and have a read/write range of approximately two inches. Preferably, two RFID antennas, a center RFID antenna 54A and a peripheral RFID antenna 54B, are employed at each hob 44. The peripheral RFID antenna 54B preferably has a read range that covers an entire quadrant of the periphery of the work coil 46 such that a handle 70 of the vessel 28, within which the RFID tag 24 is located, can be located anywhere within a relatively large radial angle and still be in communication with the RFID reader/writer 52. In an equally preferred embodiment, this particular advantage arising from using two RFID antennas 54A,54B is achieved by using a single large antenna that can read any RFID tag 24 in the field above the work coil 46. In both embodiments, the read/write range of the RFID reader/writer 52 is advantageously larger than the single center RFID antenna used in the prior art. As desired, it is also possible to eliminate the center RFID antenna 54A and use only the peripheral RFID antenna 54B if fewer features are needed.

Using two RFID antennas 54A,54B may require that they be multiplexed to the RFID reader/writer 52. Multiplexing can be accomplished using any of several methods. In a first method, a switching relay is provided that switches the connection between the RFID reader/writer 52 and the RFID antennas 54A,54B such that only one RFID antenna is used for transmission at any given time. It is also possible to power both RFID antennas 54A,54B at all times without sacrificing significant read/write range by configuring the RFID antennas 54A,54B in parallel. The location of the peripheral RFID antenna 54B is chosen so that the RFID tag 24 of the vessel 28 is positioned over the reception area of the peripheral RFID antenna 54B when the vessel 28 is placed on the hob 44. A suitable RFID antenna for use in the present invention is available, for example, from Gemplus as the Model 1" antenna or the model Medio A-SA antenna.

The real-time clock 56 maintains accurate time over long periods. Preferably, the clock 56 is microprocessor compatible and contains a back-up power supply that can operate for prolonged periods even when the range 22 is unplugged. Typically, the clock 56 has a crystal-controlled oscillator time base. Suitable clocks for use in the present invention are well-known in the prior art and are available, for example, from National Semiconductor as the model MM58274C or from Dallas Semiconductor as the model DS-1286. It will be appreciated by those with ordinary skill in the art that the microprocessor 48 typically includes a real-time clock feature that can serve as the real-time clock 56.

The additional memory 58 is accessible by the microprocessor 48 and is capable of being both easily written to and easily replaced so as to allow the user to add software algorithms whenever a new type of vessel 28, not previously programmed for, is desired to be used on the range 22. A suitable memory for use in the present invention is a flash memory card available, for example, from Micron Technology, Inc., as the model CompactFlash™ card. Another suitable memory is an EEPROM device or a flash memory device that includes a modem connection so as to allow for reprogramming from a remote site over a telephone line.

The user interface 60 allows for communication and information exchange between the range 22 and the user. The display 62 may be any conventional liquid crystal display or other suitable display device. Similarly, the input mechanism 64 may be an easily cleaned membranous keypad or other suitable input device, such as, for example, one or more switches or buttons.

As mentioned, the RFID tag 24 is affixed to, incorporated into, or otherwise associated with the cooking or heating vessel 28, and is operable to communicate and exchange data with the microprocessor 48 via the RFID reader/writer 52. More specifically, the RFID tag 24 stores information concerning the vessel's identity, capabilities, and heating history, and can both transmit and receive that information to and from the RFID reader/writer 52. The RFID tag 24 must also have sufficient memory to store recipe information, as discussed below. Preferably, the RFID tag 24 is able to withstand extreme temperatures, humidity, and pressure. A suitable RFID tag for use in the present invention is available from Gemplus as the model GemWave™ Ario 40-SL Stamp. This particular RFID tag has dimensions of 17 mm×17 mm×1.6 mm, and has a factory-embedded 8 byte code in block 0, page 0 of its memory. It also has 2 Kbits of EEPROM memory arranged in 4 blocks, with each block containing 4 pages of data, wherein each page of 8 bytes can be written to separately by the RFID reader/writer 52. Other suitable RFID tags, also from Gemplus, include the Ario 40-SL Module and the ultra-small Ario 40-SDM.

The temperature sensor 26 is connected to the RFID tag 24 and is operable to gather information regarding the temperature of the vessel 28. Any temperature sensor or transducer, such as, for example, a thermistor or resistance temperature device (RTD), with a near linear voltage output relative to temperature can be used in the present invention to provide an analog signal which, when converted to a digital signal by the RFID tag 12, can be transmitted to the RFID reader/writer 52 within normal communication protocols. A suitable, though not necessarily preferred, RFID reader/writer and passive RFID temperature-sensing tag was devised for the present invention based upon technology developed by Phase IV Engineering of Boulder Colo., and Goodyear Tire and Rubber Company of Akron, Ohio, disclosed in U.S. Pat. No. 6,412,977, issued to Black, et al. on Jul. 2, 2002, titled "Method for Measuring Temperature with an Integrated Circuit Device", and U.S. Pat. No. 6,369,712 issued to Letkomiller, et al. on Apr. 9, 2002, titled "Response Adjustable Temperature Sensor for Transponder", both of which are hereby incorporated by reference into the present application. Unfortunately, the particular RFID tag used by Phase IV Engineering provides neither write capability nor sufficient memory, and thus another RFID tag with these necessary features must be used in conjunction with the less capable RFID tag. In order to minimize complexity and cost, however, the preferred system 20 utilizes only one RFID tag 24 to perform temperature sensing and other feedback communications and to process information storage.

The temperature sensor 26 must touch an outside surface of the vessel 28. If an RTD is used, for example, it may be permanently attached to the most conductive layer of the vessel 28. For multi-ply vessels, such as those most commonly used for induction cooking, the preferred attachment layer is an aluminum layer. Furthermore, it is preferred to locate the point of attachment no more than one inch above the induction-heated surface of the vessel 28. The temperature sensor 26 is preferably attached using ceramic adhesive to an outside surface of the vessel 28 at a location where the vessel's handle 70 attaches to the vessel's body. Alternatively, the temperature sensor 26 may be attached using any other suitable and appropriate mechanism, such as, for example, mechanical fasteners, brackets, or other adhesives, as long as the attachment mechanism ensures that the temperature sensor 26 will maintain sufficient thermal contact with the vessel 28 throughout its life.

Figure 2:
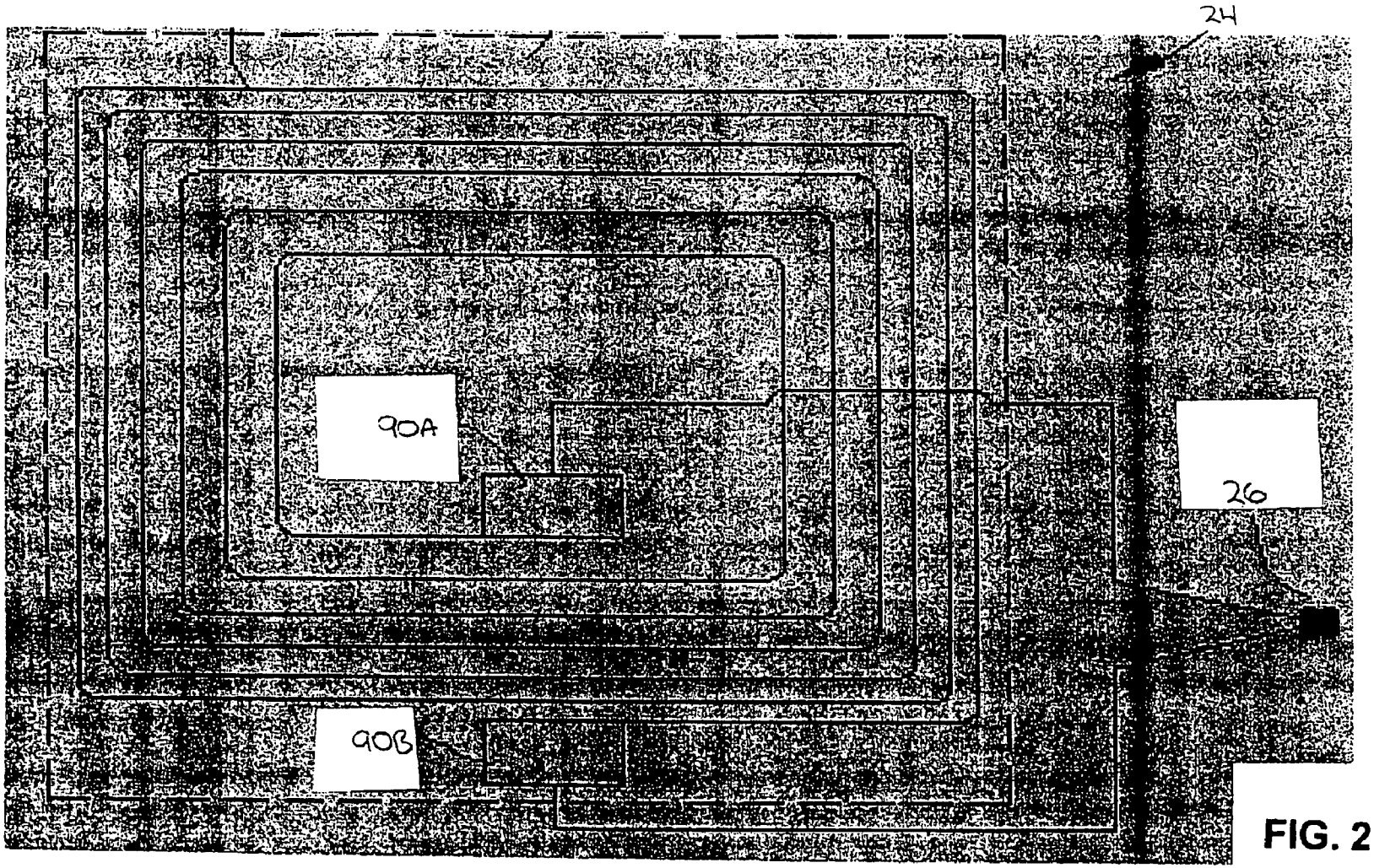
FIG. 2 is a schematic showing components of the RFID tag and temperature sensor used in the system shown in FIG. 1.

Any wires connecting the temperature sensor 26 to the RFID tag 24 are preferably hidden, such as, for example, in the vessel's handle 70. If the vessel 28 is such that its handle 70 is more than one inch above the induction-heated surface, the temperature sensor 26 and wires may be hidden within a metal channel so that the RFID tag 24 can remain in the handle 70. Though not essential, the RFID tag 24 is preferably sealed within the handle 70 so that water does not enter the handle 70 during washing. Referring to FIG. 2, a schematic is shown of how the temperature sensor 24 may be attached to the RFID tag 24. The two wire leads of the RFID tag 24 are welded to the RFID tag 24 such that the welding pads 90A, 90B connect the temperature sensor 26 to the RFID tag's integrated circuit (IC).

Figure 3:
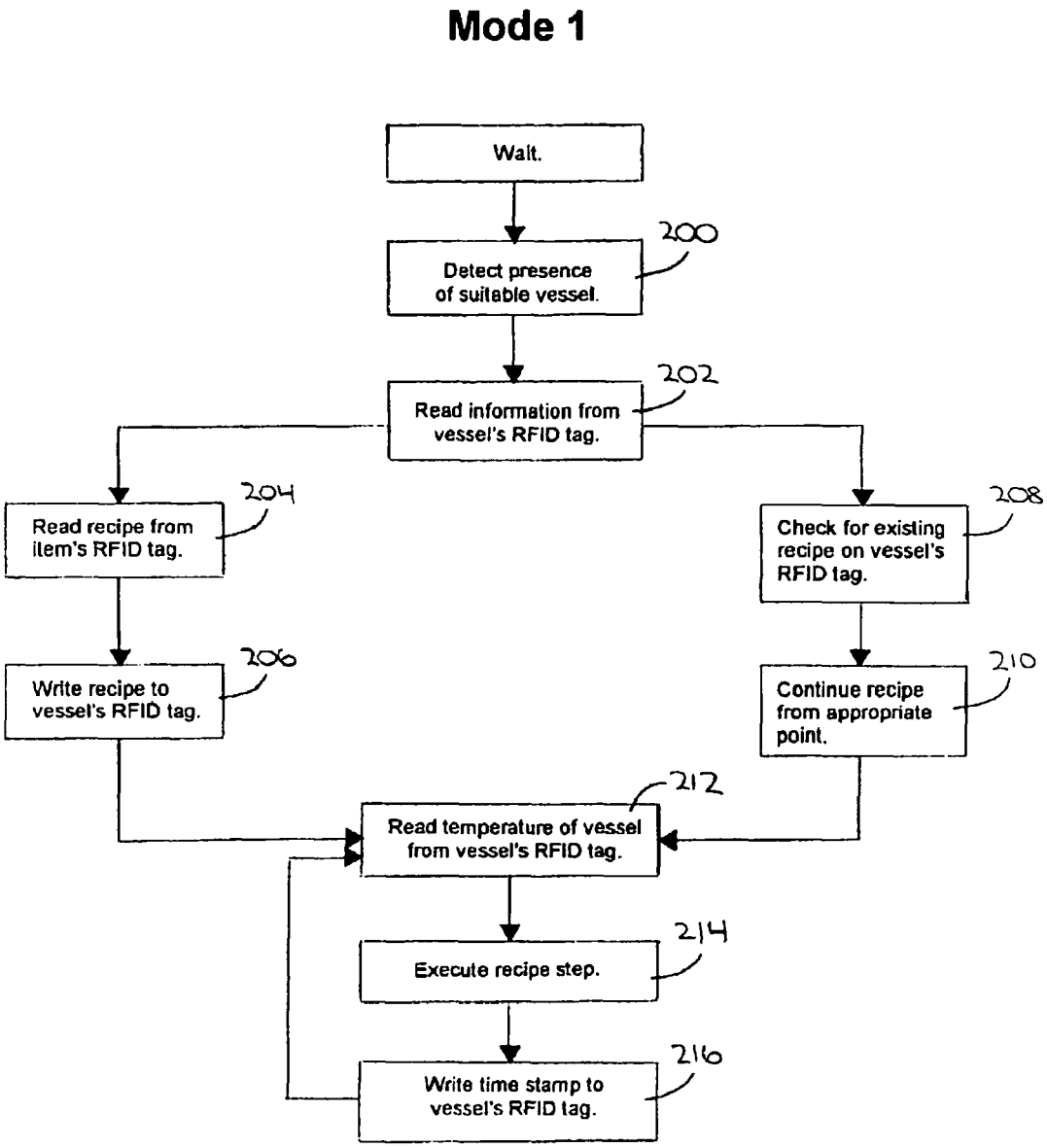
FIG. 3 is a first flowchart of method steps involved in a first mode of operation of the system shown in FIG. 1.
Figure 4:
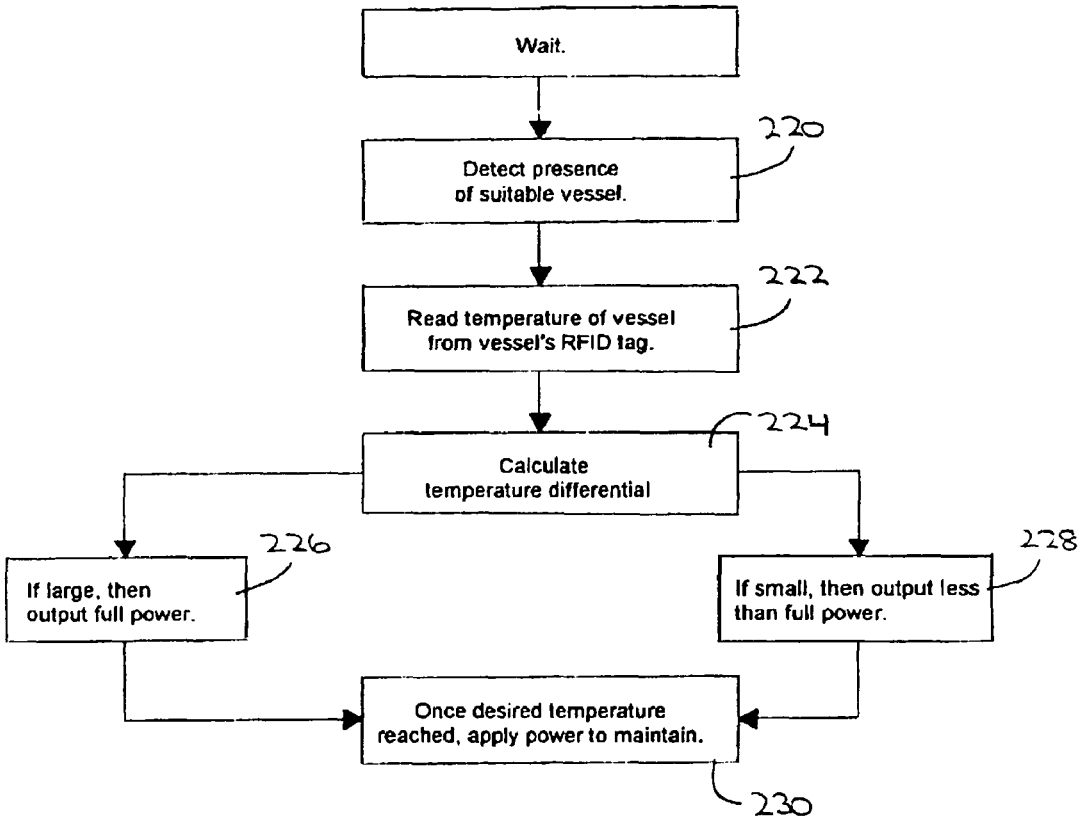
FIG. 4 is a second flowchart of method steps involved in a second mode of operation of the system shown in FIG. 1.
Figure 5:
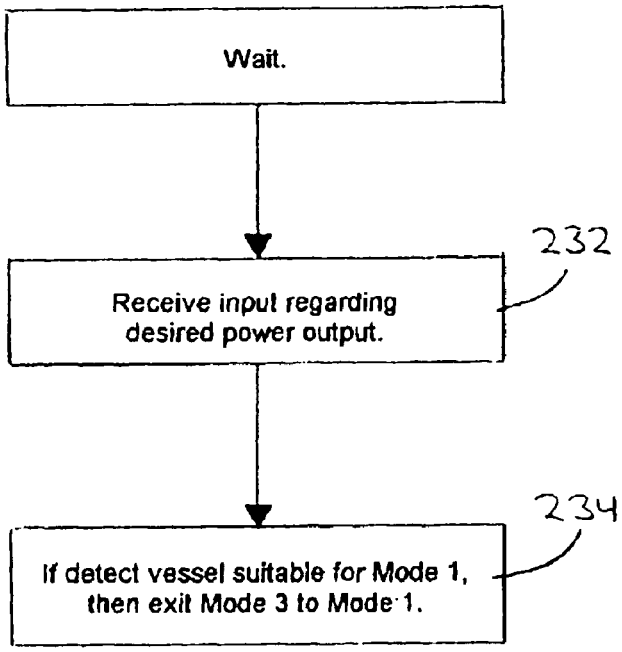
FIG. 5 is a third flowchart of method steps involved in a third mode of operation of the system shown in FIG. 1.

In exemplary use and operation, referring to FIGS. 3-5, the system 20 functions as follows. The system 20 provides at least three different modes of operation: Mode 1, an enhanced RFID mode, is for vessels 28 that have both an RFID tag 24 and a temperature sensor 26; Mode 2, a manual RFID mode, is also for vessels 28 that have both an RFID tag 24 and a temperature sensor 26; and Mode 3, a manual power control mode, is for vessels that have no RFID tag and no temperature sensor.

When the range 22 is first powered-up, the hob 44 defaults to Mode 1. The hob's microprocessor 48 awaits information from the RFID reader/writer 52 indicating that a vessel 28 having a suitably programmed RFID tag 24 has been placed on the vessel support structure 50, as depicted in box 200. This information includes a "class-of-object" code that identifies the vessel's type (e.g., frying pan, sizzle pan, pot) and capabilities. Until this information is received, no current is allowed to flow in the work coil 46, and thus no unintended heating can occur. If the hob 44 is provided with two RFID antennas 54A,54B, as is preferred, then the RFID tag 24 may be read by either the center RFID antenna 54A or the peripheral RFID antenna 54B. Once the vessel 28 has been detected, process and feedback information, described below in greater detail, is downloaded from the RFID tag 24 and processed by the microprocessor 48, as depicted in box 202. The aforementioned class-of-object code will inform the microprocessor 48 of or allow the microprocessor 48 to select an appropriate heating algorithm. Several different heating algorithms, including those described in aforementioned U.S. Pat. No. 6,320,169, each employing different feedback information and process information (stored on the RFID tag 24), are stored in the additional memory 58 and available to the microprocessor 48.

At this point, the user may, as desired, download a recipe or other cooking or heating instructions to the hob 44 as depicted in box 204. A recipe card, food package, or other item provided with its own RFID tag on which is stored the recipe is simply waved over one of the hob's two antennas 54A,54B so that the RFID reader/writer 52 can read the attached RFID tag 24 and download the recipe. The aforementioned process and feedback information may include recipe steps already completed, including when those steps were completed.

If the vessel 28 includes both an RFID tag 24 and a temperature sensor 26, then the class-of-object code will reflect that capability. If a recipe has been downloaded to the hob 44, and a vessel 28 having a class-of-object code indicating both an RFID tag 24 and a temperature sensor 26 is placed on the hob 44, the RFID reader/writer 52 will upload or write the recipe information to the vessel's RFID tag 24, as depicted in box 206. If the vessel 28 is thereafter moved to a different hob, the different hob can read the recipe and the process and feedback information from the vessel's RFID tag 24 and continue with the recipe from the step last completed or other appropriate step. In order for the recipe be written to a vessel's RFID tag 24, the vessel 28 must be placed on the hob 44 within a fixed time interval, such as, for example, approximately between 10 seconds and 2 minutes, after the recipe has been downloaded into the microprocessor 48. Thus, once the recipe has been downloaded, the hob 44 immediately begins searching for an RFID tag 24 with the appropriate class-of-object code. If the hob 44 cannot detect such a vessel 28 during the fixed time interval, it will cease its attempts and, if the user still wishes to proceed, the recipe must be downloaded again to initiate a new fixed time interval.

If a recipe has not been scanned into the hob 44 but the hob 44 detects a vessel 28 having the appropriate class-of-object code, the hob 44 will check to see if a recipe has been recently written (by another hob) to the vessel's RFID tag 24, as depicted in box 208. To accomplish this, the hob's microprocessor 48 reads the vessel's process and feedback information to determine an elapsed time since a recipe was last written to the vessel's RFID tag 24. If the elapsed time indicates that a recipe was recently in progress, then the microprocessor 48 will proceed to complete the recipe after determining an appropriate point or step within the recipe at which to start, as depicted in box 210. For example, the elapsed time and sensed temperature may indicate that the vessel 28 has cooled substantially since completion of a previous heating step, such that the heating step should be repeated. If, however, the elapsed time indicates that a recipe was not recently in progress or has been completed, then the microprocessor 48 may ignore any recipe found in the RFID tag 24 and prompt the user to for new instructions or to download a new recipe to the hob 44.

Following the write operation, the entire recipe is stored in the vessel's RFID tag 24. The recipe may be very long and detailed and may include ingredients and amounts, a sequence for adding the ingredients, stirring instructions, desired vessel type, vessel regulation temperature for each recipe step, maximum power level to be applied to the vessel 28 during each recipe step (some processes may require very gentle heating while others can tolerate high power applications), duration of each recipe step, delay times between each recipe step, holding temperature (after recipe completion) and maximum holding time, and a clock time to begin execution of the recipe so that cooking can begin automatically at the indicated time. Additional information may be included, depending on memory space.

Figure 6:
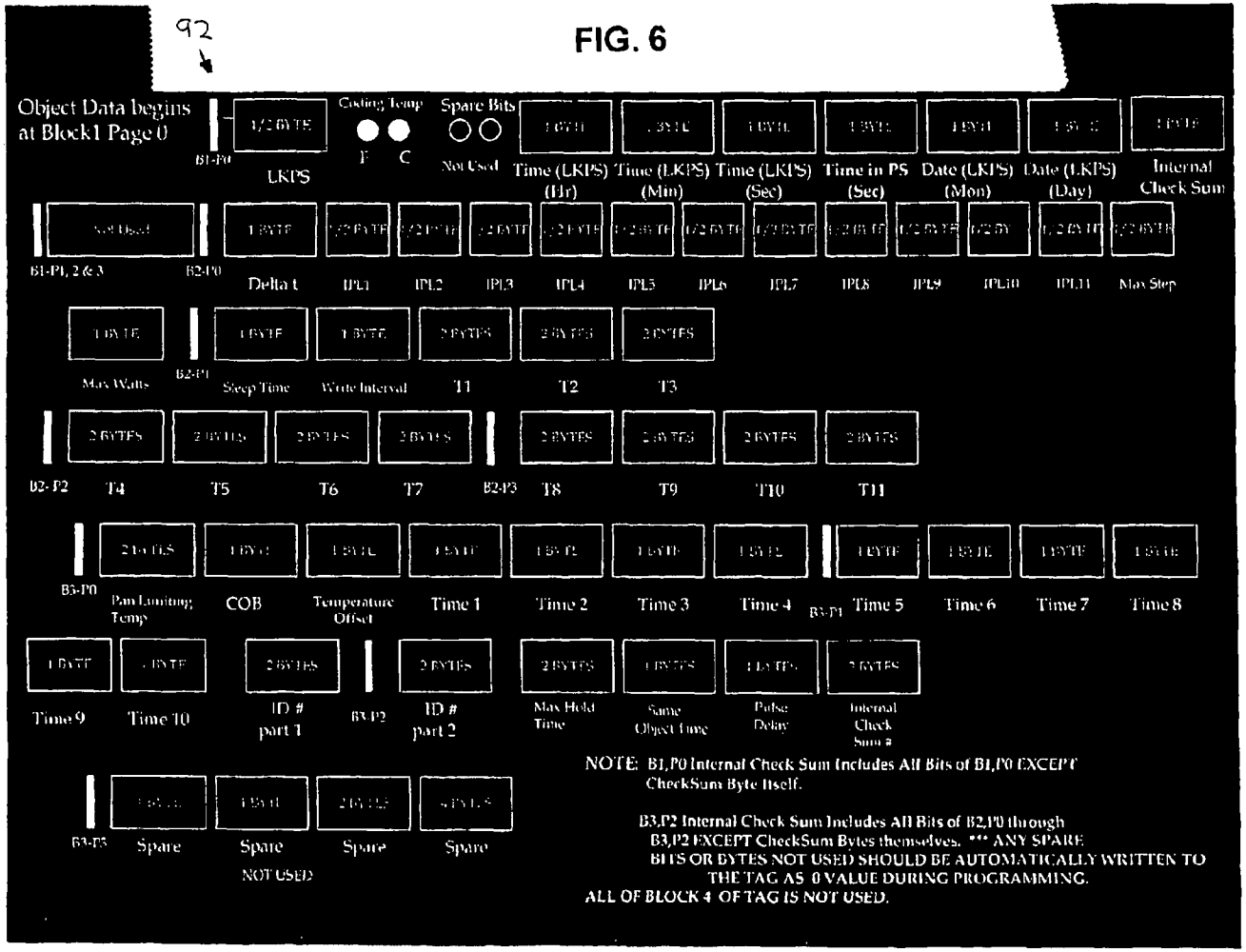
FIG. 6 is a schematic of an RFID tag memory layout used in the system shown in FIG. 1.

Referring to FIG. 6, a schematic 92 is shown of the RFID tag's layout showing memory locations and memory allocation. This same layout can be used both in the vessel's RFID tag 24 and in the RFID tag on which the recipe is initially provided. The following memory locations, most or all of which store process or feedback information and are written to by the RFID reader/writer 52 periodically, are shown in FIG. 6:

LKPS (½ byte)

The last recipe step executed.

Time(LKPS) (Hr); Time(LKPS) (Min); Time(LKPS) (Sec)

The time from the real-time clock 56 used to provide a time stamp for calculating elapsed time.

Time in Power Step

An integer corresponding to the amount of time, in ten second intervals, that the vessel 28 has operated in the current recipe step. If the vessel 28 is removed from the hob 44 during a recipe step, then this value will be read when the vessel 28 is replaced on any hob. The hob's microprocessor 48 will subtract this value from the step's specified duration and will continue the recipe step for the remainder of that time.

Date (LKPS) (Moo); Date (LKPS) (Day)

The date from the real-time clock 56 used to provide a time stamp for calculating elapsed time.

Internal Check Sum

A Cyclic Redundancy Code (CRC) that is generated by the RFID reader/writer 52 each time a write operation is completed and written to the RFID tag 24 each time a write operation occurs. Two CRC internal check sum values are shown, one is in Block 1, Page 0 of memory (B1P0) and the other is in Block 3, Page 2 of memory (B3P2).

Delta t

Each integer of this value represents a 10 ms time interval that occurs between read operations of the RFID tag 24 by the RFID reader/writer 52.

IPL1-IPL11

These values (0-15) divided by 15 give the maximum percentage of maximum power allowed during corresponding recipe power steps. For example, IPL1=15 means that 100% of maximum power may be applied during recipe step #1; IPL2=10 means that 66% of maximum power may be applied during step #2.

Max Step

The maximum number of recipe steps plus one. The additional "plus one" step is a holding step that follows the completion of all other steps.

Max Watts

The maximum power, in 20 watt increments, that the cooking procedure is allowed to apply during any recipe step (see the description of IPL1-IPLK15, above). Improper coupling of the vessel 28 with the hob 44 may limit the true output power of the hob to less than Max Watts.

Sleep Time

The number of minutes after which, if no load is detected, the hob 44 will enter a sleep mode wherein which no further searching for RFID tags nor any output of power is performed. In this sleep state, the user must provide a mode select input using the range's input mechanism 64 to reactivate the hob 44.

Write Interval

A multiple of Delta t that defines the time interval between writing to the RFID tag 24 what LKPS and t(LKPS) have just occurred. When the vessel 28 is removed from the hob 44 and placed on a different hob, this writing function allows the different hob 44 to determine the amount of time remaining in the current recipe step. For example, if Delta t has a value of 200 (making Delta t equal to 2 seconds), and "Write Interval" has a value of 5, then the RFID tag 24 should be written to every 10 seconds.

T1-T11

The temperature that the hob 44 attempts to maintain during the corresponding recipe step. There are only ten possible Mode 1 recipe step cooking temperatures, and one additional "T" value reserved for the holding temperature. The hob 44 will attempt to maintain the specified temperature using feedback from the temperature sensor and a learning algorithm that samples the feedback to calculate temperature differentials from the desired temperatures and rates of temperature change.

Limiting Temp

The maximum temperature that the vessel 28 can safely reach. If the vessel's temperature reaches this value, the user interface display 62 flashes the temperature and an appropriate warning. If the vessel's temperature remains at the Limiting Temperature for a predetermined length time, such as, for example, approximately 60 seconds, or exceeds the Limiting Temperature, then the hob 44 ceases to heat the vessel 28 and enters the sleep mode and must be reset before further use.

COB

The class-of-object code that tells the hob's microprocessor 48 what type of vessel 28 is present, what feedback information will be provided, and what heating algorithm to employ. For example, if the COB has the value of 4, then the hob 44 determines that the vessel has temperature-sensing capability. If the hob 44 is in Mode 1 when COB=4 is determined, a recent recipe scan must have been accomplished before the vessel 28 will be heated, as described above. If the hob 44 is in Mode 2 when COB=4 is determined, a user-selected regulation temperature will be maintained, as described below.

Temperature Offset

This value accommodates a variety of different vessels and vessel manufacturers by compensating for the temperature sensors being in different places on the vessels, some being further away from the vessels' bottoms than others. This value is needed only during transient heating conditions, not in maintenance conditions when the sensed temperature is within a "maintenance band" of temperatures about the desired regulation temperature. This value provides flexibility to compensate for different transient lags on the RFID tag 24. This value equals the percentage of the selected regulation temperature, and at a sensed temperature equal to the user-selected temperature minus the Temperature Offset the hob 44 will consider that the desired regulation temperature has been achieved and will enter a maintenance condition.

Time 1-Time 10

The duration or elapsed time that the vessel 28 must remain at its respective temperature (see the description of T1-T11, above) or within 10% of that value before the recipe step is complete and the hob 44 proceeds to perform the next recipe step. For example, when recipe step #1 commences, a timer is started; when the timer has reached a value equal to Time 1, the hob 44 moves to recipe step #2. If the vessel 28 is removed during a power step, the timer is reset; when the vessel 28 is replaced, LKPS and Time(LKPS) are used to determine the elapsed time remaining within that step.

Temperature Coding

A toggle switch consisting of two bits in B1-P0. Either "F" for Fahrenheit or "C" for Celsius is selected. This is mainly used during initial programming of a recipe (COB=5) so that the temperature values, T1-T11, of the recipe will be properly interpreted.

Max Hold Time

The maximum hold time, in 10 minute intervals, that a vessel 28 can stay in the maintenance mode before the hob 44 goes to sleep.

Same Object Time

This value defines an interval wherein a vessel 28 can be removed from and replaced on a hob 44 and the timer will resume without resetting. If the elapsed time of removal is greater than Same Object Time, then the timer is reset and the step must be repeated.

Pulse Delay (1 byte)

This value defines, in maintenance mode only, the number of write intervals that pass between each Writing To Tag of B1P0 information. For example, if Pulse Delay equals 0, then the RFID tag 24 is updated with B1P0 information each write interval. However, if Pulse Delay equals 3, then 3 write intervals pass between each write operation to B1PO. Thus, if Write Interval is 2, Delta t is 100, and Pulse Delay is 3, then once maintenance mode is entered, 8 seconds would pass between each write operation (2 seconds for temperature check but empty write, 2 seconds to the next temperature check but empty write, 2 seconds to the next temperature check but empty write, and then 2 seconds to the next temperature check, the results of which are written to B1P0.

Internal Check Sum #

A CRC (Cyclic Redundancy Code) that is generated by the RFID reader/writer 52 each time a write operation is Completed. The CRC check sum value is written to the RFID tag 24 each time a write operation occurs. Two CRC internal check sum values are shown in memory, one is in Block 1, Page 0 of memory (B1P0) and one is in Block 3, Page 2 of memory (B3P2).

Once the vessel's RFID tag 24 has been recently programmed with recipe information, the hob 44 it is on or any other hob it is moved to will sense this and will immediately read the temperature of the vessel 28 via its temperature sensor 26, as depicted in box 212. The hob 44 will then proceed with the recipe steps to actively assist the user in preparing the food in accordance with the recipe, as depicted in box 214. Such assistance preferably includes, for example, prompting the user, via the display 62 of the user interface 60, to add specified amounts of ingredients at appropriate times. The user may be required to indicate, using the input mechanism 64 of the user interface 60, that the step of adding ingredients has been completed. The assistance also preferably includes automatically heating the vessel 28 to a temperature specified by the recipe and maintaining that temperature for a specified period of time. Such assistance may continue until the recipe is completed.

During the Mode 1 recipe-following process, a time stamp reflecting execution of each recipe step as well as the time elapsed in performing the step is periodically written to the vessel's RFID tag 24, as depicted in box 216. As mentioned, if the user removes the vessel 28 from a hob 44 prior to completion and then replaces the vessel 28 on another hob, the new hob's microprocessor will continue the recipe process at an appropriate point as indicated by the vessel's RFID tag 24. Adjustments may need to be made to the recipe times; for example, a total elapsed time at a recipe-stipulated temperature for the most recent recipe step may need to be increased because the vessel 28 may have cooled excessively while away from a hob. Preferably, the automatic assistance provided by the range 22 can be overridden as desired by the user in order to, for example, increase or decrease the duration of a step.

By way of example, the following is a likely sequence of events for Mode 1 operation of the range 22 with a fry pan vessel 28 having an RFID tag 24 and temperature sensor 26 in its handle 70. First, the user scans a food package over the peripheral RFID antenna 54B of the hob 44 in order to transfer the recipe information stored in the package's RFID tag 24 to the hob's microprocessor 48. The range's display 62 then begins to communicate instructions to the user. Once the fry pan's handle 70 is placed over the peripheral RFID antenna 54B, the recipe information is uploaded into the pan's RFID tag 24 and the sequence of cooking operations begins automatically. Preferably, the user must provide an input via the input mechanism 64 before the hob 44 begins each cooking operation in the automatic sequence. This requirement prevents the range from, for example, heating the pan 28 before a necessary ingredient is added.

If the cooking vessel does not include a temperature sensor, then, still operating in Mode 1, the hob will download information from the RFID tag and begin heating the vessel according to its process data, feedback data, and appropriate heating algorithm. This procedure is thoroughly described in U.S. Pat. No. 6,320,169.

If the cooking vessel has no RFID tag or no RFID tag with a suitable class-of-object code, no heating will occur. The hob 44 will simply continue to search for a suitable RFID tag or wait for the user to select another operating mode.

Mode 2 is a manual RFID-enhanced mode. Mode 2 is entered via the input mechanism 64 of the range's user-interface 60. Once in Mode 2, the hob's microprocessor 48 awaits process information from a suitable RFID tag 24 prior to allowing any current to flow within the work coil 46 to heat the vessel 28. Mode 2 can be used only for vessels having both RFID tags and temperature sensors; no other class-of-object code will allow the user to operate in Mode 2.

Preferably, the process information that accompanies the appropriate class-of-object code includes a limiting temperature and a temperature offset value. The limiting temperature, described above, is the temperature above which the hob's microprocessor 48 will not allow the pan to be heated, thereby avoiding fires or to protecting non-stick surfaces or other materials from exceeding designed temperatures. The limiting temperature is programmed into the vessel's RFID tag 24 by the vessel's manufacturer prior to sale. The temperature offset value, described above, is preferably a percentage of the selected regulation temperature which becomes a desired temperature during transient heat-up conditions. For example, if the value of the temperature offset is 10, then only during transient heating or heat-up operations will the hob's microprocessor 48 attempt to achieve a regulation temperature equal to the user-selected temperature minus 10%. The use of the temperature offset value is only necessary during heat-up because the temperature of the side walls of some vessels (where the temperature is actually measured) lags behind the average temperature of the vessels' bottom surfaces. Once the vessel 28 is in a steady state condition or is in a cool-down mode, the temperature lag is insignificant and does not warrant the temperature offset value and associated procedure. Therefore, once the vessel 28 reaches the desired temperature during a heat-up condition, the hob's microprocessor 48 reverts to holding the actual user-selected temperature during the subsequent maintenance or cool-down sequence.

The main function of Mode 2 is to allow the user to place an appropriate vessel 28 on the hob 44; to manually select a desired regulation temperature via the user interface 60; and to be assured that the hob 44 will thereafter automatically heat the vessel 28 to achieve and maintain the selected temperature (as long as the selected temperature does not exceed the limiting temperature) regardless of the load (food) added or subtracted from the vessel 28. Preferably, the range 22 allows the user to select vessel regulation temperatures from at least between 68° F. and 500° F.

In operation, Mode 2 proceeds as follows. Once a proper RFID tag-equipped vessel 28 is placed upon a hob 44 operating in Mode 2, one of the two RFID antennas 54A,54B will read the class-of-object code and the aforementioned process data from the RFID tag 24, as depicted in box 220. Furthermore, the temperature of the vessel 28 is read by the RFID reader/writer 52 and transmitted to the hob microprocessor 48 (see U.S. Pat. No. 6,320,169 for details concerning communications between the RFID reader/writer 52 and the microprocessor 48), as depicted in box 222. Assuming that the selected or desired temperature is above the sensed temperature and below the limiting temperature, the hob's work coil 46 will output an appropriate level of power to heat the vessel 28 from its present to its desired temperature. By "appropriate" level of power, it is meant that the microprocessor 48 will calculate a temperature differential (desired temperature minus sensed temperature) to determine what power level to apply, as depicted in box 224. If the temperature differential is large (more than, for example, 20° F.), the hob will output full power to the vessel 28, as depicted in box 226. Once the differential is calculated to be positive but not large (less than 20° F.), the output power can be reduced to a lower level, such as, for example, 20% of maximum, as depicted in box 228. This type of appropriate power selection can reduce temperature overshoot during heating operations. Also, if a non-zero value of temperature offset is stored in the RFID tag's memory, the hob 44 will reduce the power to prevent overshoots based upon an attempt to reach the selected regulation temperature minus the product of the selected regulation temperature and the temperature offset value. Furthermore, once the hob 44 detects that the vessel 28 has reached, or exceeded, its desired temperature, it can select an appropriate level of power output to maintain the desired temperature, as depicted in box 230. By taking periodic temperature measurements and calculating temperature differentials from the desired temperature, the microprocessor 48 can select ever-changing power outputs that will successfully maintain the vessel 28 temperature within a narrow band about the selected regulation temperature regardless of the cooling food load experienced by the vessel 28. Of course, this adaptive feature of determining appropriate power output levels can also be employed in Mode 1 to maintain a desired temperature.

It will be appreciated that Mode 2 can also include the feature of Mode 1 involving writing information to the RFID tag 24 so that a process in progress can be completed by another hob. In Mode 2, this feature would involve writing the desired temperature to the RFID tag 24 so that if the vessel 28 is moved to another hob, the new hob can complete the heating process without requiring additional input from the user.

Mode 3, which is known in the prior art, is a manual power control mode that does not employ any RFID information, such that any induction-suitable vessel or object can be heated in Mode 3. In Mode 3 the user selects, via the user interface 60, a desired power output level which is a percentage of the maximum power that the work coil 46 can generate, as depicted in box 232. In Mode 3 the induction range 22 operates much like a conventional gas range. State-of-the-art induction cooktops, such as, for example, the CookTek C1800, all operate in some fashion in a manual power control mode.

A feature of Mode 3 in the present invention which is not disclosed in the prior art is that if any vessel having an RFID tag and an appropriate class-of-object code is placed on the hob 44, the hob 44 will automatically leave Mode 3 and enter Mode 1 and execute an appropriate procedure, as depicted in box 234. This feature attempts to prevent the user from inadvertently employing Mode 3 with a vessel that they mistakenly believe will achieve automatic temperature regulation in that mode. Other mechanisms to prevent the user from inadvertently employing Mode 3 may also employed in the present invention, including, for example, requiring that the user enter Mode 3 from Mode 2. This prevents the user from accidentally entering directly into Mode 3. Another such mechanism is an automatic "no-load" reversion to Mode 1, wherein if no suitable load is detected over the work coil 46 for a pre-programmed amount of time, such as, for example, approximately between 30 seconds and 2 minutes, while a hob 44 is in Mode 3, then the microprocessor 48 will automatically revert to Mode 1.

From the preceding description, it will be appreciated that the cooking and heating system 20 of the present invention provides a number of substantial advantages over the prior art, including, for example, providing for precisely and substantially automatically controlling a temperature of a vessel 28 that has an attached RFID tag 24. Furthermore, the present invention advantageously allows a user to select the desired temperature of the vessel 28 from a wider range of temperatures than is possible in the prior art. The present invention also advantageously provides for automatically limiting heating of the vessel 28 to a pre-established maximum safe temperature. The present invention also provides for automatically heating the vessel 28 to a series of pre-selected temperatures for pre-selected elapsed times. Additionally, the present invention advantageously ensures that any of several hobs 44 are able to continue the series of pre-selected temperatures and pre-selected elapsed times per temperature even if the vessel 28 is moved between hobs 44 during execution of the series. The present invention also advantageously provides for compensating for any elapsed time in which the vessel 28 was removed from the range during the series, including, when necessary, restarting the process at an appropriate point in the recipe. Additionally, the present invention advantageously provides for exceptionally fast thermal recovery of the vessel 28 to the selected temperature regardless of any change in cooling load, such as the addition of frozen food to hot oil in the vessel 28.

Additionally, the present invention advantageously provides for reading and storing recipe or other cooking or heating instruction from food packages, recipe cards, or other items. The recipe may be stored in an RFID tag on the item and may define the aforementioned series of pre-selected temperatures for pre-selected elapsed times. The present invention also advantageously provides for writing the recipe or other instructions to the RFID tag 24 of the vessel 28, thereby allowing execution of the recipe to continue even after the vessel 28 has been moved to another hob into which the recipe was not initially entered. The present invention also advantageously provides for interactive assistance, including prompting, in executing the recipe or other instructions.

Although the invention has been described with reference to the preferred embodiment illustrated in the attached drawings, it is noted that equivalents may be employed and substitutions made without departing from the scope of the invention as recited in the claims.

Having thus described the preferred embodiment of the invention, what is claimed as new and desired to be protected by Letters Patent includes the following:

What is claimed is:

1. A method of heating a vessel using a range having an RFID [reader/writer] *reader*, wherein the vessel includes an RFID tag and a temperature sensor, the method comprising the steps of:

(a) reading a set of heating instructions from an external storage medium *separate from said vessel and selected from the group consisting of a recipe card and a food package*, wherein the heating instructions include a sequence of one or more heating steps, with at least one of the heating steps including a desired temperature;

(b) detecting the vessel and identifying vessel information;

(c) reading the actual temperature of the vessel from the RFID tag;

(d) determining a temperature differential between the desired temperature of the set of heating instructions and the actual temperature; and (e) controlling heating of the vessel based at least in part upon the temperature differential.

2. The method as set forth in claim 1, further comprising the step of repeating steps (c)-(e) until the sequence of heating steps is complete.

[3. The method as set forth in claim 1, further comprising the step of writing the set of heating instructions to the vessel RFID tag.]

4. The method as set forth in claim [3] *16*, wherein the action of detecting [and identifying] the vessel further includes detecting whether a second set of heating instructions in the vessel RFID tag is in progress and proceeding without the action of writing if a second set of heating instructions is in progress.

5. The method as set forth in claim 1, wherein the set of heating instructions is a recipe.

6. The method as set forth in claim 1, wherein the external storage medium of step (a) is contained on a RFID tag associated with a food package.

7. The method as set forth in claim 1, wherein the external storage medium of step (a) is contained on a RFID tag associated with a recipe card.

8. The method as set forth as set forth in claim 1, further comprising the step of prompting a user to perform an action in accordance with the set of heating instructions.

9. The method as set forth in claim 8, wherein the step of prompting a user further comprises delaying the next heating instruction step until a user provides an input to the range.

10. The method as set forth in claim [1] *16*, further including the step of writing a heating history to the RFID tag so that if the vessel is moved to a second RFID reader/writer the second RFID reader/writer can read the heating history.

11. The method as set forth in claim 10, wherein the heating history includes a last known actual temperature, a time when the last known actual temperature occurred, and a last step completed in the sequence of beating steps prior to the vessel being moved to the second RFID reader/writer.

12. The method as set forth in claim 10, further including the step of determining from the heating history an elapsed time as a difference between a current time and the time when the last known actual temperature occurred.

13. The method as set forth in claim 12, wherein if the elapsed time is greater than a first pre-established value then the last step completed in the sequence of heating steps is repeated.

14. The method as set forth in claim 12, wherein if the elapsed time is less than [the] *a* first pre-established value then [the] a next step in the sequence of heating steps is begun, wherein the next step in the sequence of heating steps immediately follows the last step in the sequence of heating steps.

15. The method as set forth in claim 1, further including the step of modifying the heating instructions in response to the identified vessel information.

16. A method of heating a vessel using an induction range having an RFID reader/writer, wherein the vessel includes an RFID tag and a temperature sensor, the method comprising the steps of:

(a) reading a set of heating instructions from an external storage medium *separate from said vessel and selected from the group consisting of a recipe card and a food package*, wherein the heating instructions include a sequence of one or more heating steps, with at least one of the heating steps including a desired temperature;

(b) detecting the vessel and writing the set of heating instructions to the vessel RFID tag;

(c) reading the actual temperature of the vessel from the RFID tag;

(d) determining a temperature differential between the desired temperature of the set of heating instructions and the actual temperature; and (e) controlling heating of the vessel based at least in part upon the temperature differential.

*17. The method as set forth in claim 16, further including the step of modifying the heating instructions in response to the identified vessel information.*

*18. The method of claim 1, further comprising the step of repeating steps (b)(i)-(iii).*

*19. The method of claim 1, further comprising the step of writing the set of heating instructions to the vessel RFID tag (24).*

*20. The method of claim 1, further comprising the step of prompting a user to perform an action in accordance with said heating instructions.*

*21. A method of heating a vessel (28) using a range (22) having an RFID reader (52), wherein the vessel (28) is on said range (22) and the vessel (28) includes an RFID tag (24) and a temperature sensor (26) operably coupled with the RFID tag (24) so that information about the actual temperature of the vessel (28) sensed by said sensor (26) is received by said RFID tag (24), the vessel RFID tag (24) storing information confirming the presence of said RFID tag (24) and said temperature sensor (26), the method comprising the steps of:*

*(a) loading heating instructions onto said reader (52) from a recipe card, food package, or other item separate from the vessel (28), including one or more heating steps including a desired vessel regulation temperature;*

*(b) heating said vessel (28) by (i) reading the temperature of the vessel (28) from the vessel's associated RFID tag (24); (ii) determining a temperature differential between said desired temperature and the vessel temperature; and (iii) controlling the heating of said vessel (28) based upon the temperature differential and said heating instructions,*

*said heating step being carried out only if said reader (52) detects the presence of a suitable vessel (28).*

* * * * *